(12) United States Patent
Haller

(10) Patent No.: US 10,744,912 B2
(45) Date of Patent: Aug. 18, 2020

(54) VEHICLE SEAT WITH BACK SUSPENSION AND SEATING SURFACE ADJUSTMENT

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 8 days.

(21) Appl. No.: 16/205,830

(22) Filed: Nov. 30, 2018

(65) Prior Publication Data

US 2019/0160982 A1    May 30, 2019

(30) Foreign Application Priority Data

Nov. 30, 2017    (DE) .................. 10 2017 128 410

(51) Int. Cl.

| | | |
|---|---|---|
| *B60N 2/39* | (2006.01) | |
| *A47C 1/032* | (2006.01) | |
| *B60N 2/50* | (2006.01) | |
| *B60N 2/52* | (2006.01) | |
| *B60N 2/38* | (2006.01) | |
| *B60N 2/90* | (2018.01) | |

(52) U.S. Cl.
CPC .......... *B60N 2/39* (2013.01); *A47C 1/03205* (2013.01); *A47C 1/03261* (2013.01); *B60N 2/38* (2013.01); *B60N 2/501* (2013.01); *B60N 2/504* (2013.01); *B60N 2/505* (2013.01); *B60N 2/507* (2013.01); *B60N 2/509* (2013.01); *B60N 2/525* (2013.01); *B60N 2002/948* (2018.02)

(58) Field of Classification Search
CPC . B60N 2/39; B60N 2/38; B60N 2/501; B60N 2/504; B60N 2/505; B60N 2/507; B60N 2/509

USPC ............................ 297/344.15, 302.1, 300.1
See application file for complete search history.

(56) References Cited

U.S. PATENT DOCUMENTS

| | | | |
|---|---|---|---|
| 2,009,024 A | | 7/1935 | Salmons |
| 4,765,679 A | * | 8/1988 | Lanuzzi ............. A47C 1/03255 |
| | | | 297/300.3 |

FOREIGN PATENT DOCUMENTS

| | | |
|---|---|---|
| DE | 102004014333 | 10/2005 |
| GB | 194376 | 3/1923 |

OTHER PUBLICATIONS

Extended Search Report for European Patent Application No. 18201425.8, dated Jun. 4, 2019, 3 pages.

(Continued)

*Primary Examiner* — Syed A Islam
(74) *Attorney, Agent, or Firm* — Sheridan Ross P.C.

(57) ABSTRACT

The invention relates to a vehicle seat comprising a backrest portion and a seating surface portion, each of which is arranged to be connected with a seat base portion, wherein the backrest portion is resiliently arranged and supported to be able to swivel with respect to the seat base portion, and wherein the seating surface portion is arranged to be able to move in at least a longitudinal direction of the seat frontwards and rearwards with respect to the seat base portion, wherein the backrest portion and the seating surface portion are operatively connected together via a first lever arrangement in such a way that the seating surface portion is able to move rearwards in the longitudinal direction of the seat when the backrest portion makes a suspending movement with respect to the seat base portion in a direction away from the seating surface portion.

20 Claims, 13 Drawing Sheets

(56) References Cited

OTHER PUBLICATIONS

Official Action for German Patent Application No. 102017128410.9, dated Aug. 3, 2018, 3 pages.
Official Action for European Patent Application No. 18201425.8, dated Jun. 2, 2020, 3 pages.

* cited by examiner

Fig. 5a                    Fig. 5b

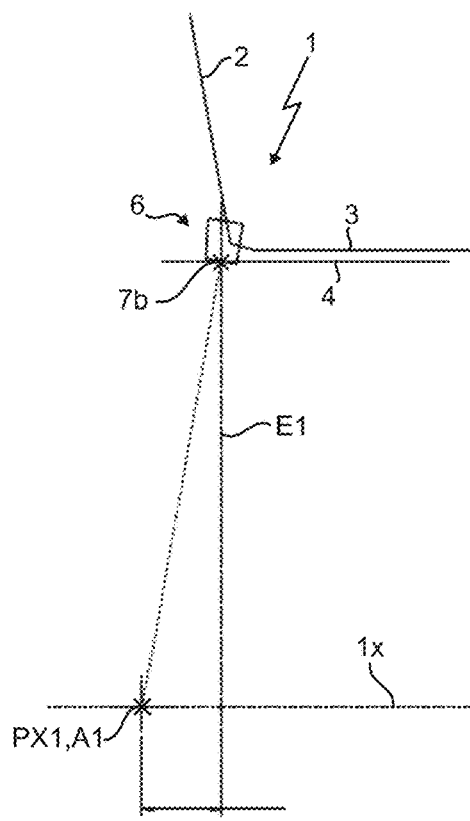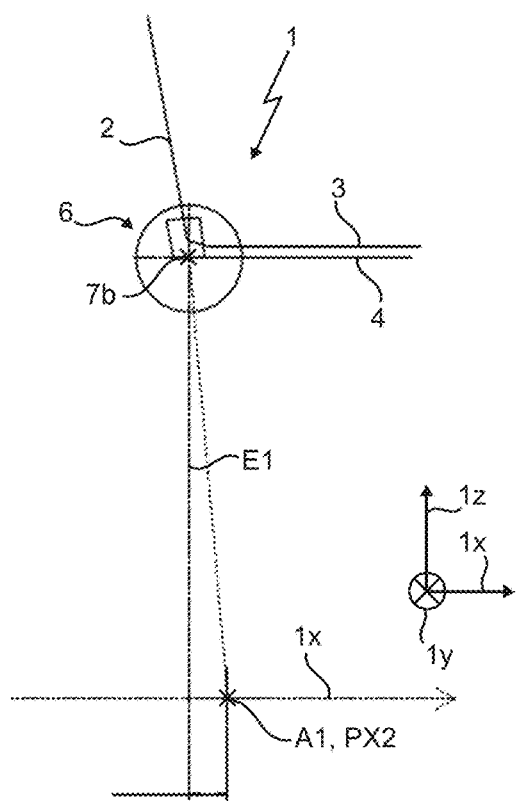
Fig. 7a
Fig. 7b
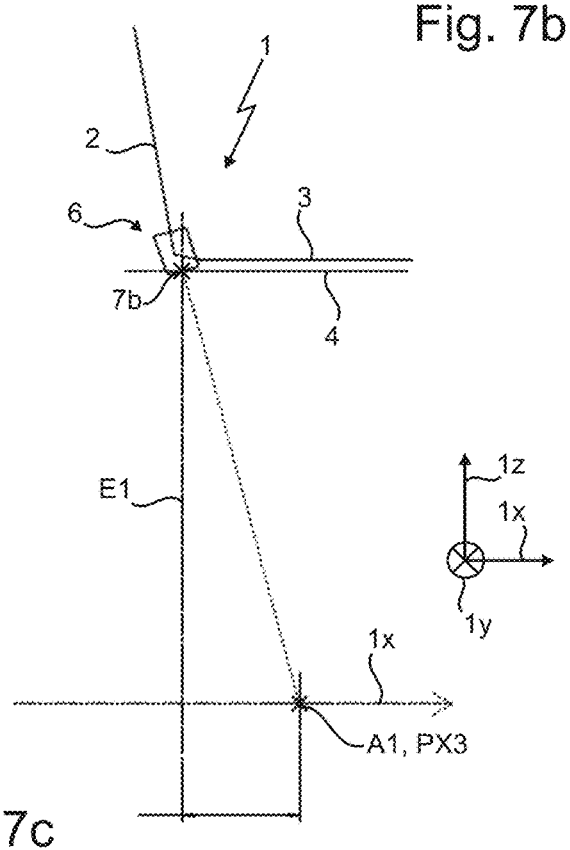
Fig. 7c

VEHICLE SEAT WITH BACK SUSPENSION AND SEATING SURFACE ADJUSTMENT

CROSS-REFERENCE TO RELATED APPLICATION

This application claims the benefit of German Patent Application No. DE 10 2017 128 410.9 filed Nov. 30, 2017, the entire contents of which are incorporated herein by reference.

FIELD

The invention relates to a vehicle seat comprising a backrest portion and a seating surface portion, each of which is arranged to connect with a seat base portion, whereby the backrest portion is resiliently arranged and supported to be able to swivel with respect to the seat base portion, and whereby the seating surface portion is arranged to be able to move in at least a longitudinal direction of the seat frontwards and rearwards with respect to the seat base portion.

BACKGROUND

Vehicle seats of this type used for off-road vehicles, trucks, MH-Turf vehicles, etc. include standardised devices which isolate vibrations in order to remove or reduce the harmful effects on the driver. Said effects constitute in particular vibrations in vertical and horizontal directions. These vibrations are typically diminished via degrees of freedom implemented using translational movement. On the one hand, the placement of these degrees of freedom is implemented in currently known systems via vertical suspension systems, and on the other hand, integrated as independent modules into the overall vehicle seat system.

SUMMARY

As illustrated in FIG. 1, which refers to an example of a vehicle V in the form of a tractor, the six driving dynamic degrees of freedom of working machines cause movements during operation of the vehicle V which can have unpleasant or harmful effects on the driver. Included among them are movements 1', 3', and 5' in the direction of the longitudinal axis x, the lateral axis y, or the vertical axis z of the vehicle V. In the present case, the axes x, y, and z correspond, for example, to the longitudinal direction $1x$, the lateral direction $1y$, and the vertical direction $1z$ of the vehicle seat 1 (see illustrations in FIG. 2 and after).

Also shown are arrows for visualising rotational movements 2', 4', and 6' around the longitudinal axis x (see arrow P1 for roll movement), around the lateral axis y (see arrow P2 for pitching movement), or around the vertical axis z (see arrow P3 for yaw movement). Therefore, a vehicle V that is pitching performs a rotational movement 4' around the lateral axis y of the vehicle V caused, for example, by driving forwards along the longitudinal axis x over an obstacle in the direction of travel.

However, the disadvantage of known systems is that the suspension systems for the backrest and the seat portion often work separately. It is not thereby possible to diminish vibration in an integrated manner.

It is generally true that vibrations are ideally diminished if the direction of movement induced as a result of vibration being initiated is designed to be oriented in a direction precisely opposite to the direction of movement inherent to the vibration. If the direction, or rather the vector, is a different one, then "unnecessary" partial movements will also be induced in the form of directions unable to help in diminishing the vibrations.

Therefore, the object of the present invention is to refine a vehicle seat of this type in such a way that vibrations are diminished as efficiently as possible.

The object of the invention is achieved by a vehicle seat comprising a backrest portion and a seating surface portion, each of which is arranged to be connected with a seat base portion, whereby the backrest portion is resiliently arranged and supported to be able to swivel with respect to the seat base portion, and whereby the seating surface portion is arranged to be able to move in at least a longitudinal direction of the seat frontwards and rearwards with respect to the seat base portion, whereby the backrest portion and the seating surface portion are operatively connected together via a first lever arrangement in such a way that the seating surface portion is able to move rearwards in the longitudinal direction of the seat when the backrest portion makes a suspending movement with respect to the seat base portion in a direction away from the seating surface portion.

Advantageously, the backrest portion and the seating surface portion are further operatively connected together via the first lever arrangement in such a way that the seating surface portion is able to move frontwards in the longitudinal direction of the seat when the backrest portion makes a suspending movement with respect to the seat base portion in a direction closer to the seating surface portion. These descriptions apply in particular to an upper end of the backrest portion and/or with respect to the longitudinal direction of the seat.

The design of the driver's seat according to the invention thus provides a backrest suspension system integrated into the upper portion of the seat in combination with and sychronised with a longitudinal suspension system also integrated into the upper portion of the seat. In the context of the present invention, the term "upper portion of the seat" is understood to mean all components which are arranged at or above the same level as the seat base portion.

By means of sychronising the suspending movements, vibrations which have been introduced into the vehicle seat are redirected in the most ergonomic manner possible. Moreover, the vibrations which have been introduced in the form of movements in the longitudinal direction of the vehicle, or in the longitudinal direction of the seat, can be efficiently diminished because a suspending movement is able to be induced in a direction oriented to oppose the direction of vibration.

In regard to rotational vibrations which have been induced, it is furthermore true that the rotational axis of the vibration introduced and the rotational axis of the rotational movement induced should be as identical as possible in order to diminish vibrations as efficiently as possible. According to an advantageous variation, it has also proven beneficial for the backrest portion to be able to swivel when making the suspending movement with respect to the seat base portion around an imaginary rotational axis extending in the lateral direction of the seat, whereby a second lever arrangement is arranged between the backrest portion and the seat base portion, said second lever arrangement swivellably connected with the backrest portion by way of a first axis and swivellably connected with the seat base portion by way of a second axis.

In the context of the present invention, the term "imaginary rotational axis" or "virtual rotational axis" is understood to mean a rotational axis which is not formed by way of mechanical elements such as a central axis of a rotating shaft, for example. Instead, it is understood to mean a rotational axis around which a given point on the swivelling body, for example the backrest portion, swivels. An axis of this kind may also be arranged in a position outside of the swivelling body.

Advantageously, the vehicle seat herein is able to be designed and/or is designed without one or multiple interfaces between the imaginary rotational axis and the backrest portion, the first lever arrangement, the second lever arrangement, the seating surface portion, and/or the seat base portion.

In this case, the first lever arrangement is advantageously arranged centrally on the vehicle seat with respect to the lateral direction of the seat and is formed by a simple number of components.

The second lever arrangement is advantageously arranged at least partially bilaterally and continuously on the vehicle seat with respect to the lateral direction of the seat. For example, the first and the second lever elements of the second lever arrangement are each respectively arranged on a left side and a right side of the vehicle seat, whereas the third and the fourth lever elements of the second lever arrangement are each designed to continuously extend from the left side to the right side of the vehicle seat. For example, a shaft element connects the first axis of the second lever arrangement on the left side of the vehicle seat with the first axis of the second lever arrangement on the right side of the vehicle seat.

Advantageously, an area of the vehicle seat arranged beneath the seating surface portion in the vertical direction of the seat is free of elements belonging to the backrest portion, the first lever arrangement, and/or the second lever arrangement. Further advantageously, the first lever arrangement and/or the backrest portion is entirely arranged above the seat base portion in the vertical direction of the seat. Further advantageously, the first lever arrangement and/or the second lever arrangement is entirely arranged behind the seating surface portion in the longitudinal direction of the seat.

Embodiments have heretofore been known from the prior art which indeed provide relief for the upper body by way of backrest suspension means, in which context, however, a corresponding degree of rotational freedom for the backrest is located at the fulcrum of the seat back or the adjustable reclining means. The rotational axis of this type of backrest suspension does not, therefore, correspond to the rotational axis of a pitching vehicle.

A preferential embodiment provides that a first degree of inclination of the backrest portion is adjustable with respect to the seating surface portion by way of a rotational movement of the backrest portion around the first axis. An adjustment of this kind offers the driver the option of adjusting the degree of inclination of the backrest portion in the most ergonomic manner possible.

Preferably, a movement of the upper end of the backrest portion around the first axis in a direction away from the seating surface portion allows a position of the seating surface portion to be adjusted frontwards in the longitudinal direction of the seat. In a similar manner, it is advantageous for a movement of the upper end of the backrest portion around the first axis in a direction closer to the seating surface portion to allow a position of the seating surface portion to be adjusted rearwards in the longitudinal direction of the seat.

Preferably, the second lever arrangement comprises a first lever element, which is swivellably connected with the backrest portion by way of the first axis, a second lever element, which is swivellably connected with the seat base portion by way of the second axis, a third lever element, which is swivellably connected with the first lever element by way of a third axis and, by way of a fourth axis, swivellably connected with the second lever element, and a fourth lever element, which is swivellably connected with the first lever element by way of a fifth axis and swivellably connected with the second lever element by way of a sixth axis, whereby a distance between the first axis and the third axis is variable such that a position of the imaginary rotational axis is adjustable in the vertical direction of the seat. The second lever arrangement can also be referred to as a four-bar linkage.

For example, the second, the third, and/or the fourth lever element are designed to extend linearly in at least one connecting direction between the axes supporting them. For example, the first element of the lever is designed to be T-shaped.

For example, the third axis, which is formed, for example, by way of a central axis of a pin, is moveably supported within a slot arranged on the first lever element of the second lever arrangement. After a movement of the third axis, the position of the associated third lever element can preferably be locked with respect to the first lever element with regard to a moving movement. Particularly preferably, the third lever element remains rotatably supported even after said locking to the first lever element. The design of the slot and the movement of the third axis within the slot is an example of how the distance between the first axis and the third axis can be designed to be variable.

The present vehicle seat can be designed such that the third and the fourth lever element of the second lever arrangement are able to be configured in parallel with one another by means of moving the third axis within the slot of the first lever element. In this case, the position of the imaginary rotational axis theoretically moves an infinite distance downwards in the vertical direction of the seat such that a suspending movement around the imaginary rotational axis causes the backrest portion to swivel along an arc with an infinite diameter, which very nearly corresponds to a parallel movement of the backrest portion in the longitudinal direction of the seat.

By means of the advantageous refinement of the vehicle seat according to the invention, the vertical position of the rotational axis around which the backrest swivels during suspending is thus able to be adjusted with respect to the vertical position of the pitch axis of the vehicle. By means of the kinematic connection and the seat plate moving in the longitudinal direction of the vehicle, the system as a whole represents a longitudinal suspension process which acts to isolate the driver from vibrations due to the aforementioned relevant degrees of freedom and the typical longitudinal and pitch movements of the vehicle resulting thereby.

According to a further preferable embodiment, a second degree of inclination is variably provided between the second lever element of the second lever arrangement and the seat base portion, as a result of which the position of the imaginary rotational axis is adjustable in the longitudinal direction of the seat. This preferably takes place by way of rotating the second lever arrangement around the second axis of the second lever arrangement, which is swivellably connected with the seat base portion as described above.

The imaginary rotational axis can in this case preferably assume a position situated to extend on either side of a plane extending through the second axis and parallel to the vertical direction of the seat, or it can be situated within said plane itself.

A system of this kind having an integrated backrest suspension and a synchronised horizontal suspension may be referred to as, for example, RBS+, with R standing for "rotation", B for "backrest", S for "suspension", and + for "synchronized horizontal suspension".

Consequently, RBS+ makes it possible to adjust the position of the rotational axis in the vertical direction of the seat and the longitudinal direction of the seat so that it is identical or nearly identical to the position of the vehicle pitch axis, which is unknown in the prior art. This offers an important advantage because, depending on the load and application in question, the vehicle pitch axis can change and the resulting vibrations are able to be diminished as much as possible by way of adjusting the rotational axis of said imaginary rotational axis of the backrest portion in an optimal manner.

At the same time, this system is able to work in combination with the moveable seat plate, which is mechanically connected with the movement of the backrest portion, and act as a novel longitudinal-horizontal suspension integrated into the upper seat portion.

In this context, locking between the second lever arrangement and the seat base portion can take place following adjustment of the rotational axis in the vertical and/or the longitudinal direction of the seat, for example via motive force from an appropriately arranged adjusting motor or via the frictional force of an appropriately arranged spindle. Other possibilities are conceivable, but they will not be elaborated in the context of the present invention.

It is furthermore conceivable that the means described (the backrest suspension, coupling the backrest suspension with the horizontal suspension and the overall vibration system) are designed individually, or that they are all designed able to engage and disengage respectively. For example, it is conceivable in this case that the disengagement takes place by interrupting a mechanical connection, for example the first and/or second lever arrangement, between the backrest and the seating surface portion, or rather between the backrest and the seat base portion.

In order to implement the synchronisation described between the backrest portion and the seating surface portion, it is conceivable that the first lever arrangement comprises a first lever element rigidly connected with the first axis as well as a second lever element, which is swivellably connected with said first lever element and which is in turn swivellably connected with the seating surface portion. For example, the second lever element of the first lever arrangement can be swivellably connected with a third lever element of the first lever arrangement, which is in turn rigidly connected with the seating surface portion.

Advantageously, the first and the second lever arrangements only comprise a common element by way of the first axis. It is conceivable that the first lever element of the first lever arrangement is arranged to be rigidly connected by way of a shaft element, the central axis of which is formed by way of the first axis of the first lever element of the second lever arrangement.

An arrangement of this kind makes it possible to convert a suspending movement of the backrest portion in the form of a rotational movement into a suspending movement of the seating surface portion in the form a translational movement. In other words, it is thus possible to couple rotary suspending of the backrest portion around the pitch axis of the vehicle, which corresponds, for example, to the lateral direction of the seat, with translational and horizontal suspending of the seating surface portion along the longitudinal direction of the vehicle which corresponds, for example, to the longitudinal direction of the seat.

It is preferable for adjustment of the position of the imaginary rotational axis to take place manually or by way of an electric or pneumatic drive element, in particular automatically.

As mentioned earlier, the suspending by the backrest portion upon introduction of vibrations preferably takes place by way of a first rotational movement of the backrest portion around the imaginary rotational axis. In addition, an adjustment of the degree of inclination of the backrest portion preferably takes place by way of a second rotational movement of the backrest portion around the first axis. As described, the first and the second rotational movements of the backrest portion are preferably able to be converted into two differently oriented translational movements, preferably two translational movements oriented in opposite directions.

Preferably, only the backrest portion, the second lever arrangement, and the first lever element of the first lever arrangement are involved in the rotational suspending movement of the backrest portion.

Particularly preferably, the position of the imaginary rotational axis deviates from the position of the first axis in a vertical direction and/or in a longitudinal direction across the entire adjustment range of the second lever arrangement. It is furthermore preferable for the imaginary rotational axis to be arranged in a preferable manner beneath the second axis in the vertical direction.

The mechanism able to be illustrated in the context of the present invention by way of adjusting the degree of inclination of the backrest portion is also referred to as a synchro mechanism. In this manner of application, said connection between the seating surface portion and the backrest portion also represents a novel approach in the vehicle industry. In this context, as described, inclining the backrest portion also causes the seating surface portion to move in a synchronous manner. Rearward adjustment of the inclination of the backrest portion causes frontward movement of the seating surface portion, whereas the seating surface portion is moved rearward when the inclination of the backrest portion is adjusted toward the front in connection with a vertical adjustment of the backrest portion.

Particularly preferably, the adjustment of the degree of inclination of the backrest portion is possible within predefinable limits; this adjustment is preferably limited by a mechanism designed using the second lever arrangement and the backrest portion. It is thus conceivable that a pin arranged on the second lever arrangement, preferably on the first lever element of the second lever arrangement, can be guided within a slot, which is formed on the backrest portion and preferably has a curved shape. As a result, adjustment via the end of the curve on which the slot is formed is not possible. Advantageously, the pin is always arranged above (in the vertical direction of the seat) the first axis of the second lever arrangement.

Further advantages, aims, and properties of the present invention are explained in reference to the attached drawings and the description hereinafter, in which an embodiment of the vehicle seat according to the invention is illustrated and described. The drawings show:

BRIEF DESCRIPTION OF THE DRAWINGS

FIGS. 5a, b, c a schematic illustration of the various suspending states of the vehicle seat according to the invention comprising a second lever arrangement;

FIGS. 7a, b, c various degrees of inclination of the second lever arrangement in order to adjust the longitudinal position of the imaginary rotational axis;

It should be noted in advance that, in the interest of clarity, some components in the drawings are illustrated in a simplified or modified manner. For example, the position of the imaginary rotational axis A1 as shown in FIGS. 4a to 4c, 6a to 6c, and 8 is in each case only shown in an illustrative manner and is in particular shown at an offset above (in the vertical direction of the seat 1z) the actual position. In particular, the first 5 and the second lever arrangement 6 are each shown in FIG. 6b using hidden lines, and they are clarified in FIGS. 4a to 4c by way of a partial cross-section view. In addition, FIGS. 3a to 3c and 5a to 5c illustrate the significant components of the vehicle seat 1 shown there in a purely schematic manner.

Figure 1:
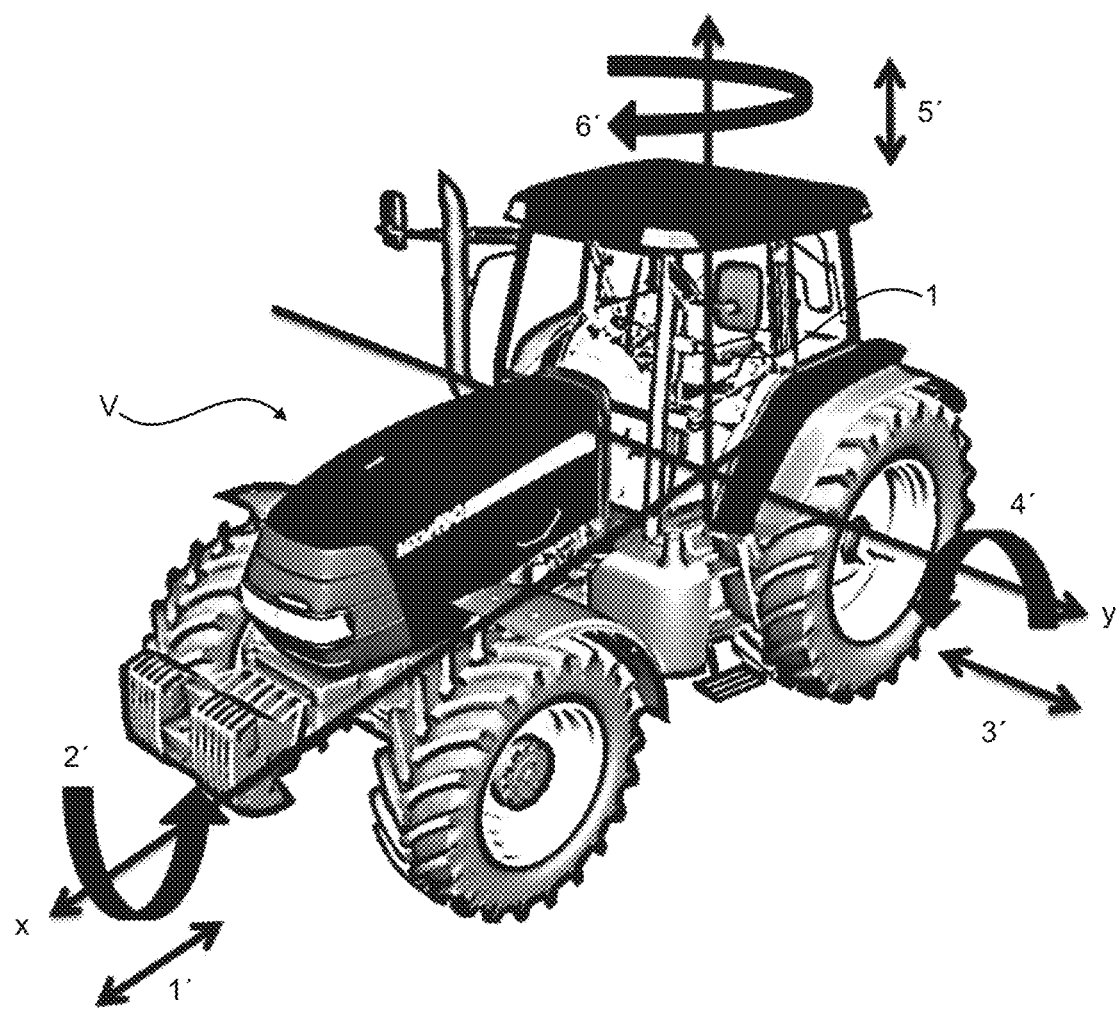
FIG. 1 an overview of the degrees of freedom of working machines.
Figure 2A:
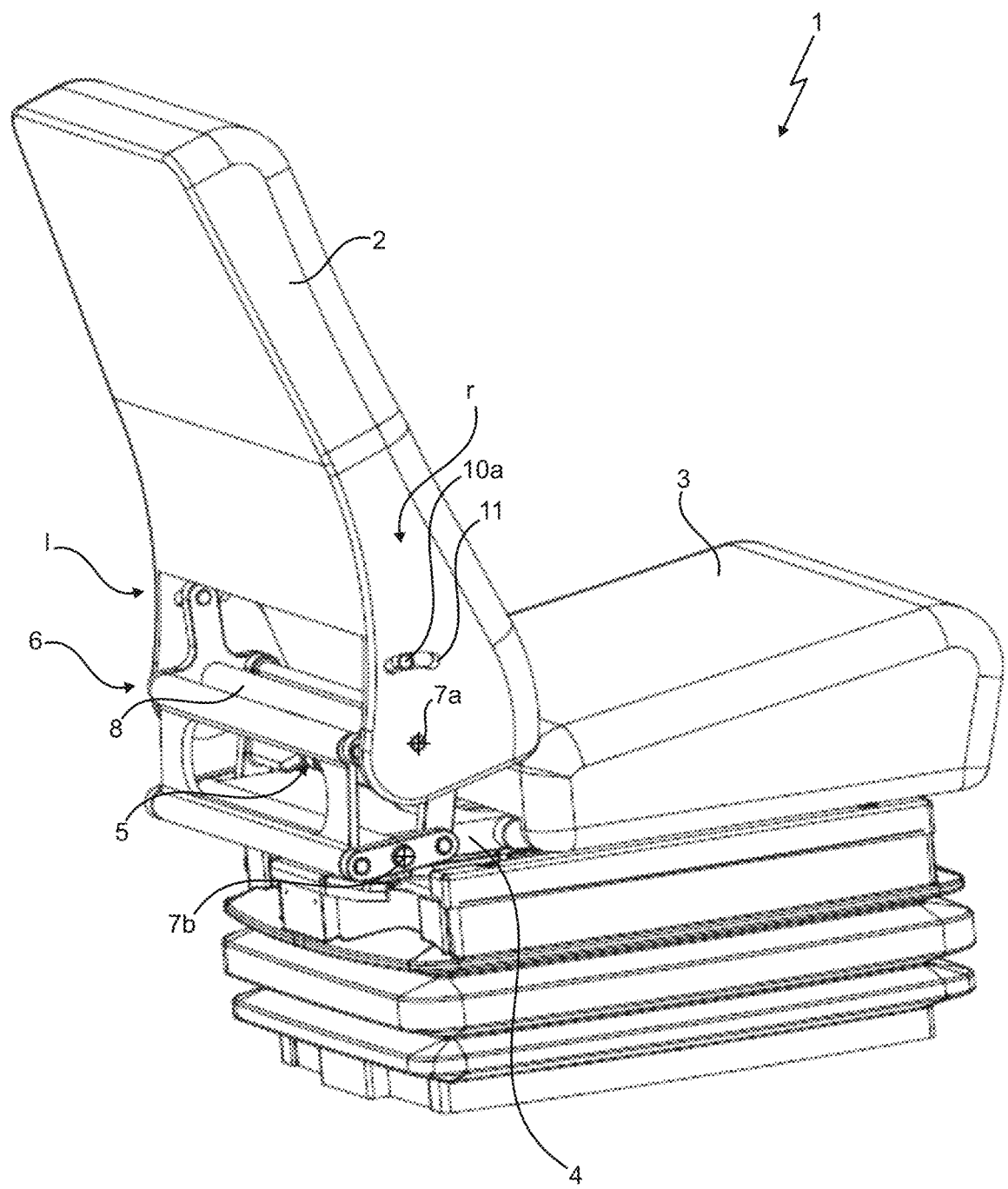
FIGS. 2a, b, c multiple schematic views of a vehicle seat according to the invention for installation in a vehicle as shown in FIG. 1.
Figure 2B:
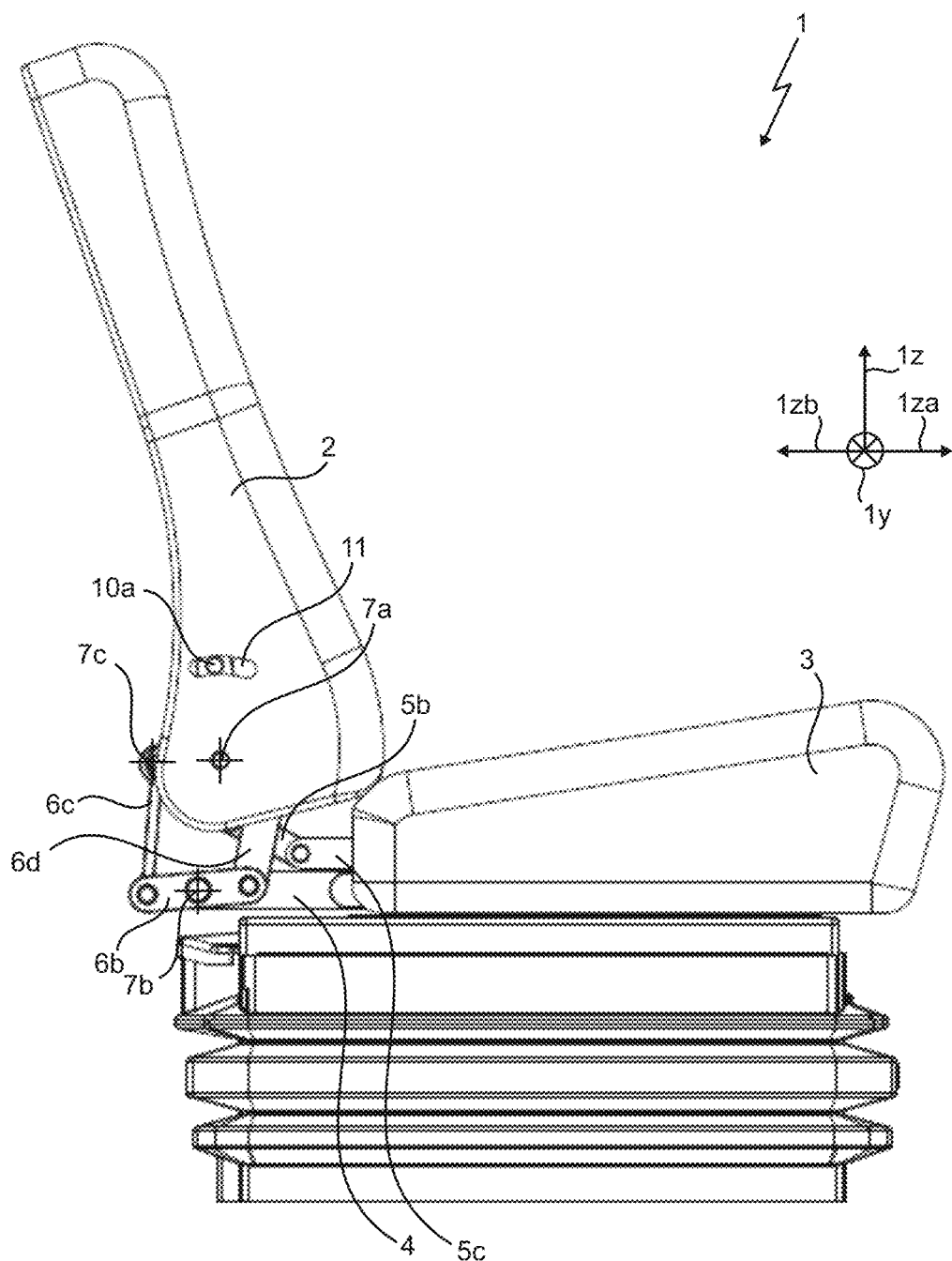
Figure 2C:
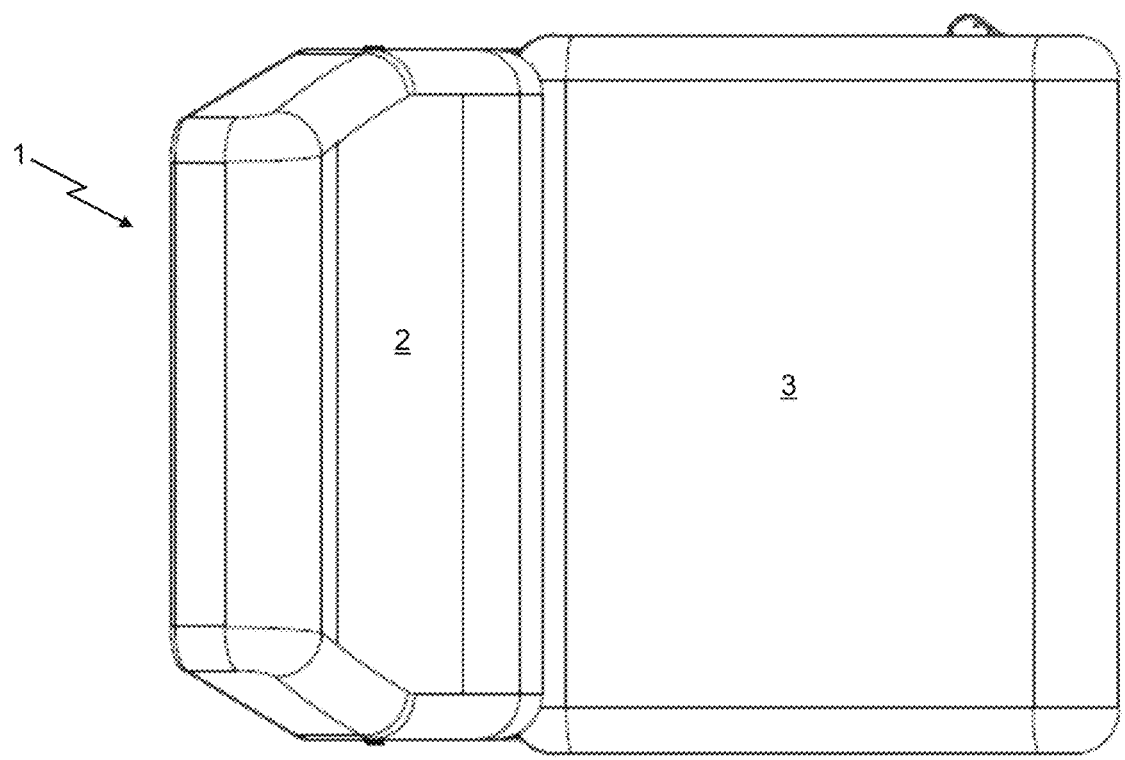
Figure 2C:
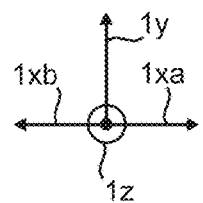

The vehicle seat 1 in FIGS. 2a to 2c is shown comprising a backrest portion 2 and a seating surface portion 3, each of which is arranged to connect with a seat base portion 4, whereby the backrest portion 2 is resiliently arranged and supported to be able to swivel with respect to the seat base portion 4, and whereby the seating surface portion 3 is arranged to be able to move in at least a longitudinal direction 1x of the seat frontwards 1xa and rearwards 1xb with respect to the seat base portion 4.

FIGS. 3a-3c, 4a-4d, and 5a-5c show that the backrest portion 2 and the seating surface portion 3 are operatively connected together via a first lever arrangement 5 in such a way that the seating surface portion 3 is able to move rearwards 1xb in the longitudinal direction 1x of the seat when the backrest portion 2 makes a suspending movement with respect to the seat base portion 4 away from the seating surface portion 3. Similarly, the backrest portion 2 and the seating surface portion 3 herein are further operatively connected together via the first lever arrangement 5 in such a way that the seating surface portion 3 is able to move frontwards 1xa in the longitudinal direction 1x of the seat when the backrest portion 2 makes a suspending movement with respect to the seat base portion 4 in a direction closer to the seating surface portion 3.

Herein, the first lever arrangement 5 is thus arranged centrally on the vehicle seat 1 with respect to the lateral direction 1y of the seat. The second lever arrangement 6 is arranged bilaterally and continuously on the vehicle seat 1 with respect to the lateral direction 1y of the seat. Herein, the first lever element 6a and the second lever element 6b are each respectively arranged on a left side l and a right side r of the vehicle seat 1, whereas the third lever element 6c and the fourth lever element 6d are each designed to continuously extend on from the left side l to the right side r of the vehicle seat. A shaft element 8 connects the first axis 7a on the left side l with the first axis 7a on the right side r.

Figure 3A:
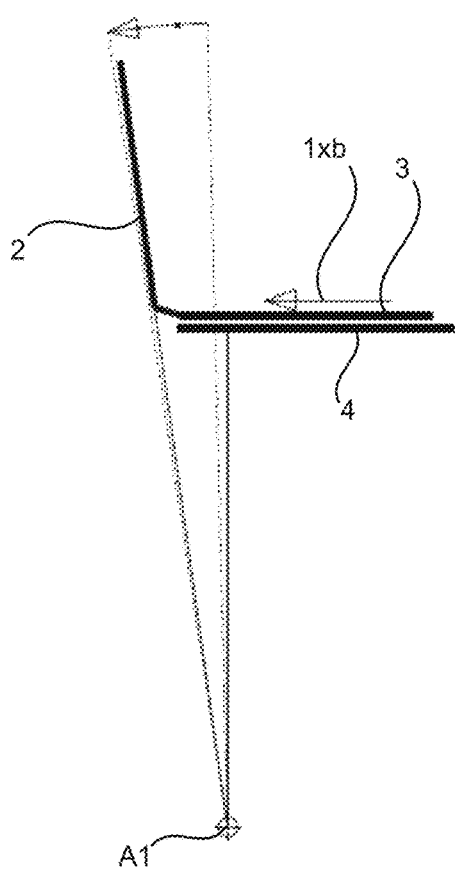
FIGS. 3a, b, c a schematic illustration of the significant components of the vehicle seat according to the invention and the imaginary rotational axis in various suspending states.
Figure 3B:
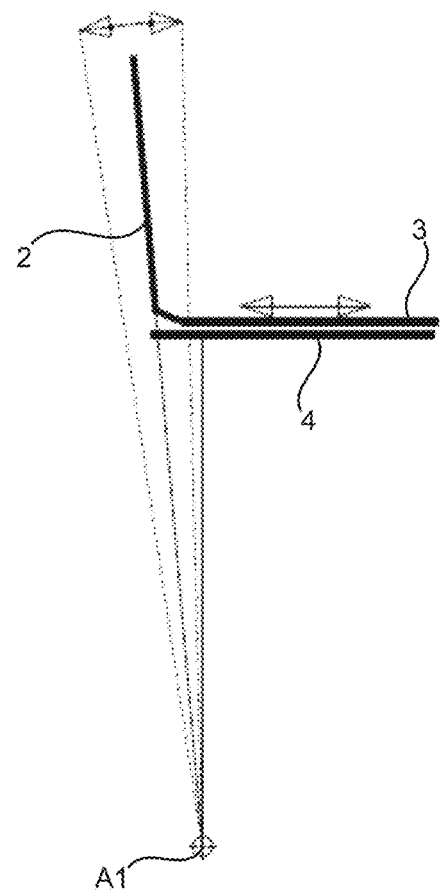
Figure 3C:
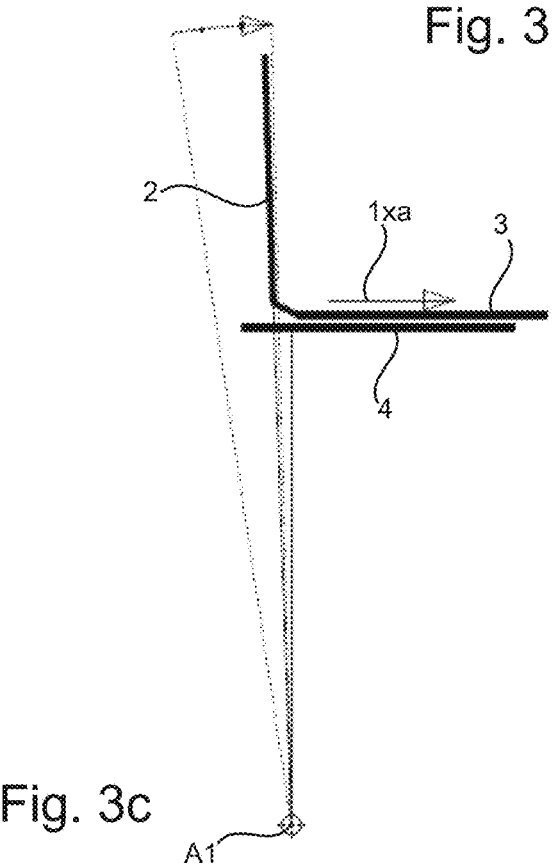

As shown in FIGS. 3a-c, the backrest portion 2 is, with the exception of the suspending movement D1, able to swivel with respect to the seat base portion 4 around an imaginary rotational axis A1 extending in the lateral direction 1y of the seat.

FIGS. 4a-c and 6a-6c show a second lever arrangement 6 arranged between the backrest portion 2 and the seat base portion 4, said second lever arrangement swivellably connected with the backrest portion 2 by way of a first axis 7a and swivellably connected with the seat base portion 4 by way of a second axis 7b.

Instead of being formed by way of mechanical elements, the imaginary rotational axis A1 represents in this case an axis around which a given point on the swivelling body, for example the backrest portion 2, swivels. Herein, the position of the imaginary axis A1 is therefore situated outside of the backrest portion 2. Herein, the vehicle seat 1 at hand is able to be designed and/or is designed without one or multiple interfaces between the imaginary rotational axis A1 and the backrest portion 2, the first lever arrangement 5, the second arrangement 6, the seating surface portion 3, and/or the seat base portion 4.

Figure 4A:
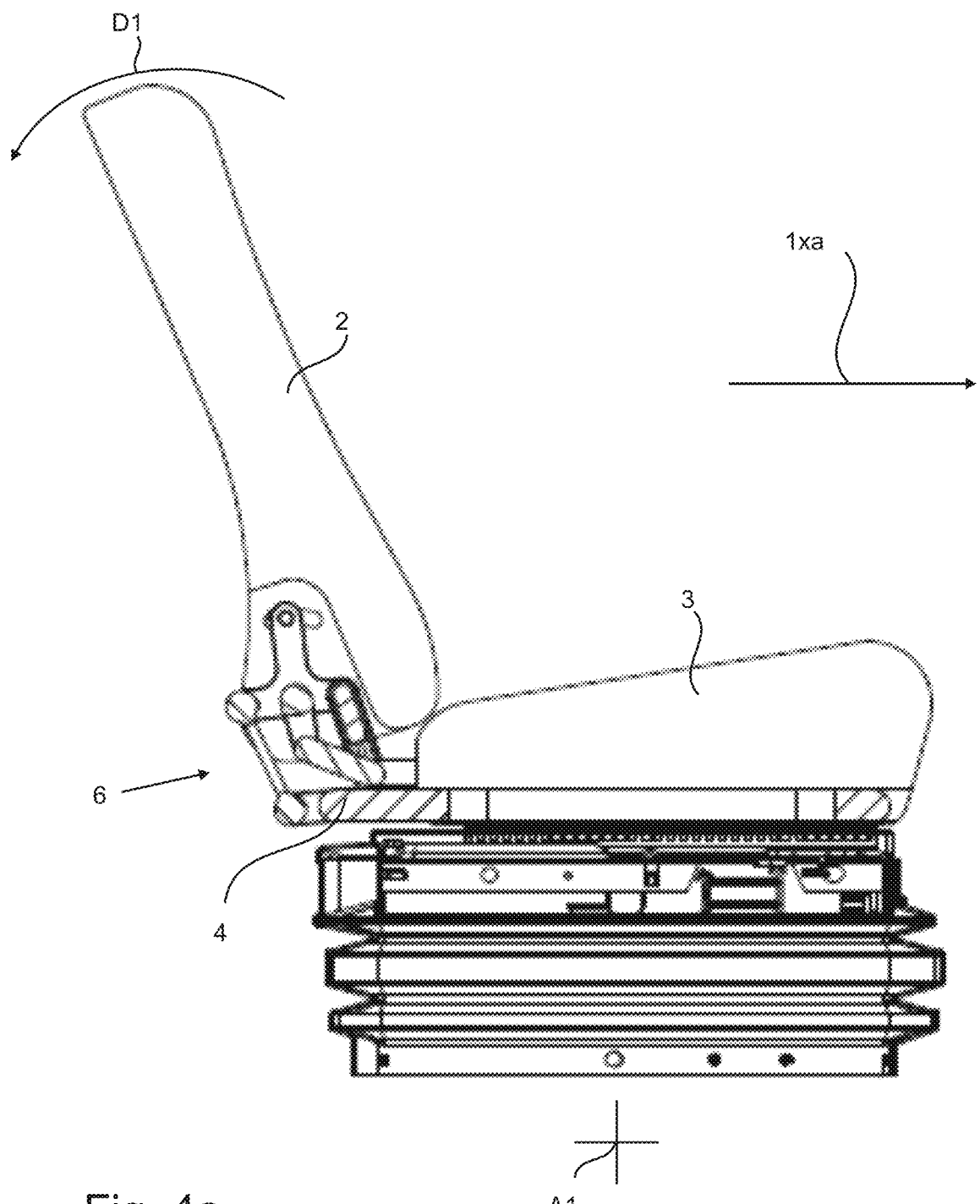
FIGS. 4a, b, c another illustration of the various suspending states of the vehicle seat according to the invention.
Figure 4B:
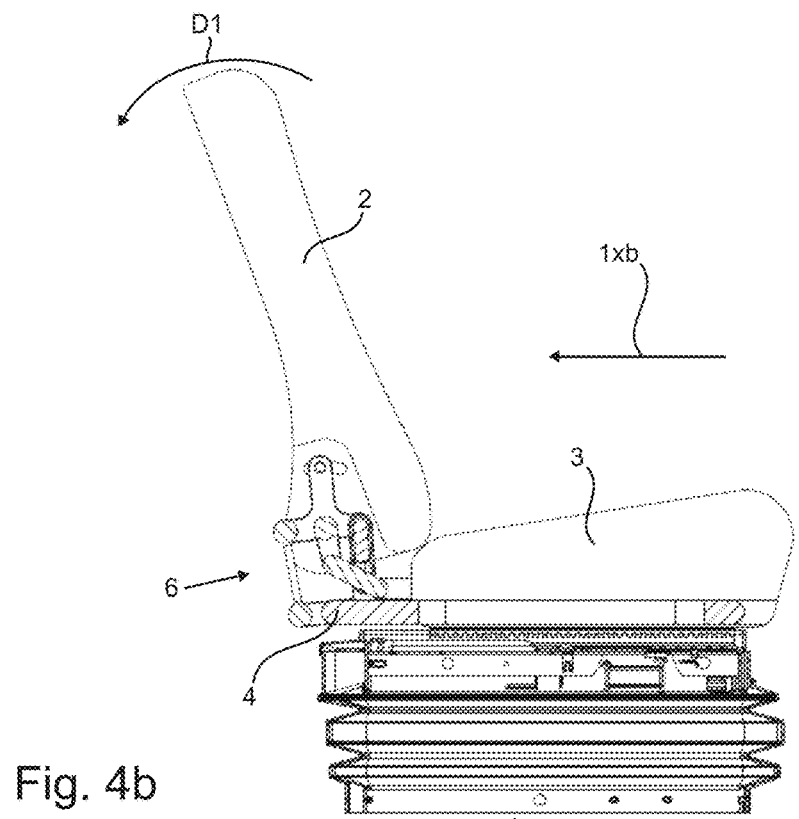
FIG. 4d an overlay illustration of the various suspending states of the vehicle seat according to the invention as shown in FIGS. 4a to c.
Figure 4C:
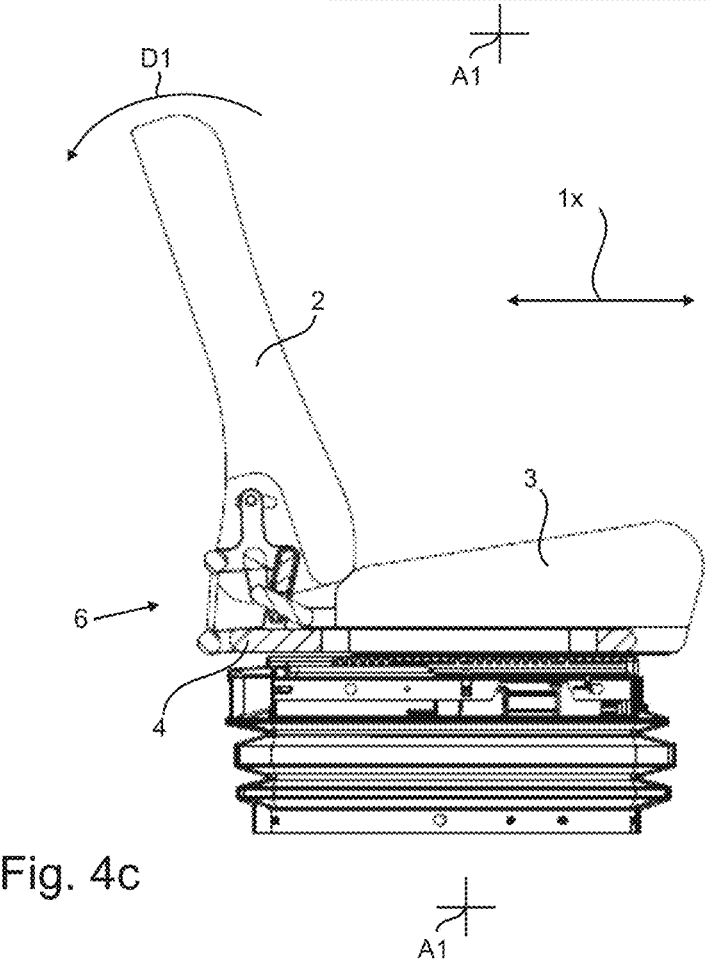
Figure 4D:
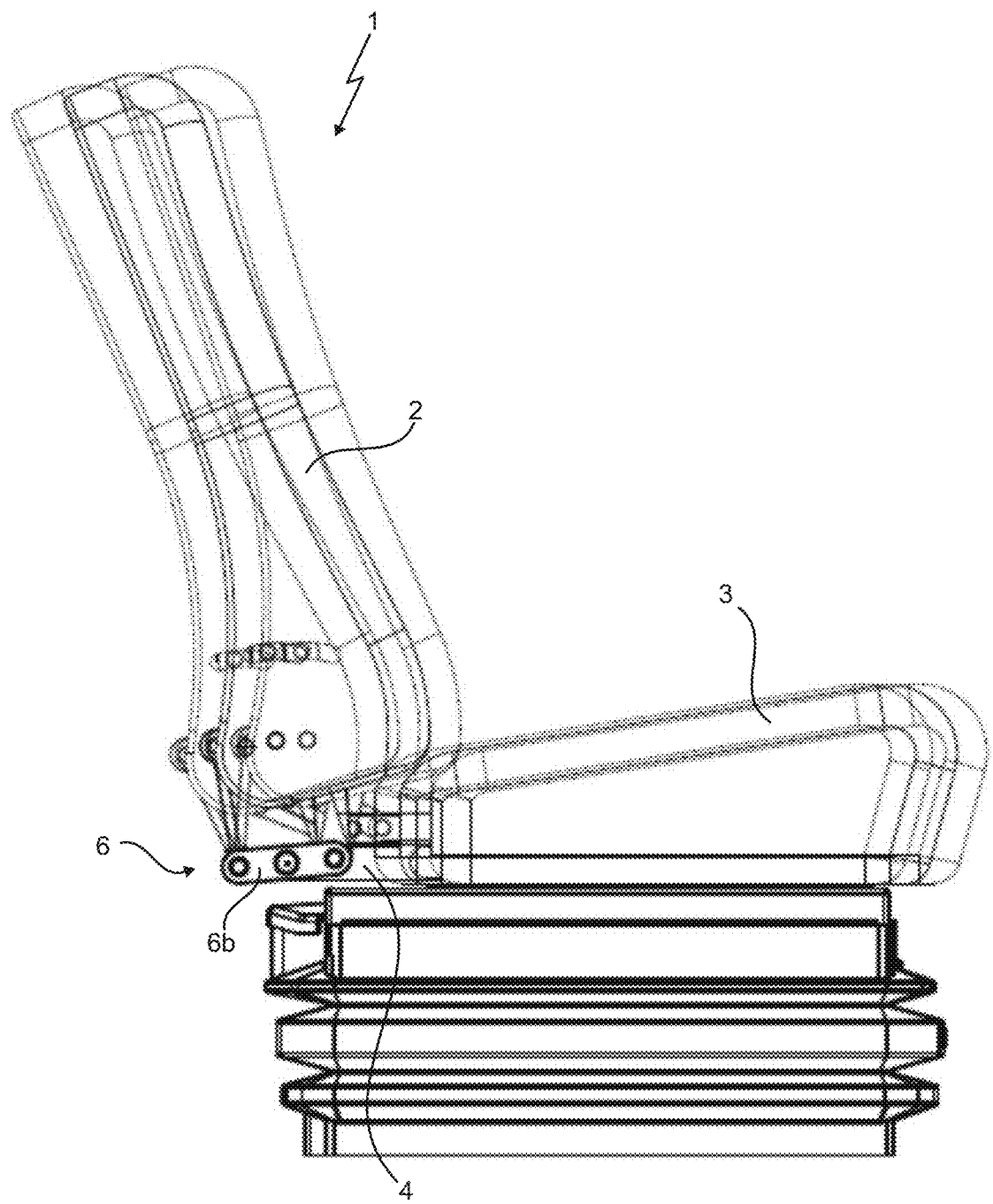
Figure 5C:
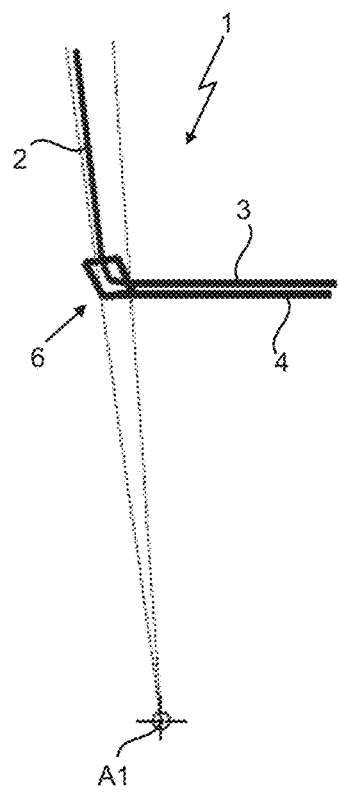
Figure 5C:
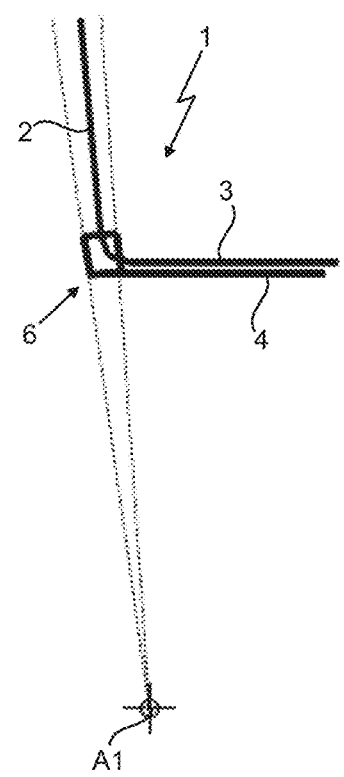
Figure 5C:
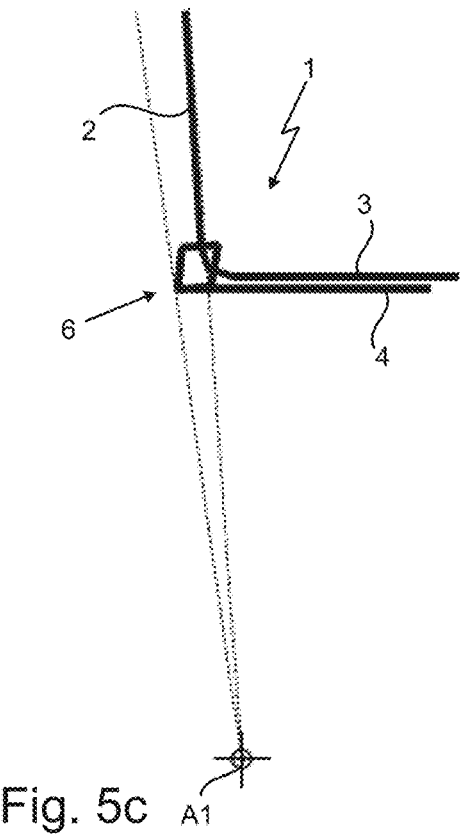

As shown in FIGS. 3a, 4a and 5a, the backrest portion 2 is suspended maximally rearwards 1xb around the imaginary rotational axis A1, which is set herein at a fixed position in a vertical position of the seat 1z and a longitudinal direction of the seat 1x; the seating surface portion 3 is likewise at its rearmost position. Similarly, as shown in FIGS. 3c, 4c, and 5c, the backrest portion 2 is suspended maximally frontwards 1xa around the imaginary rotational axis A1; the seating surface portion 3 is likewise at its frontmost position. FIGS. 3b, 4b, and 5b each show the backrest portion 2 in a position between the maximum positions thereof shown in FIGS. 3a, 4a, and 5a, as well as in FIGS. 3c, 4c, and 5c.

Figure 9A:
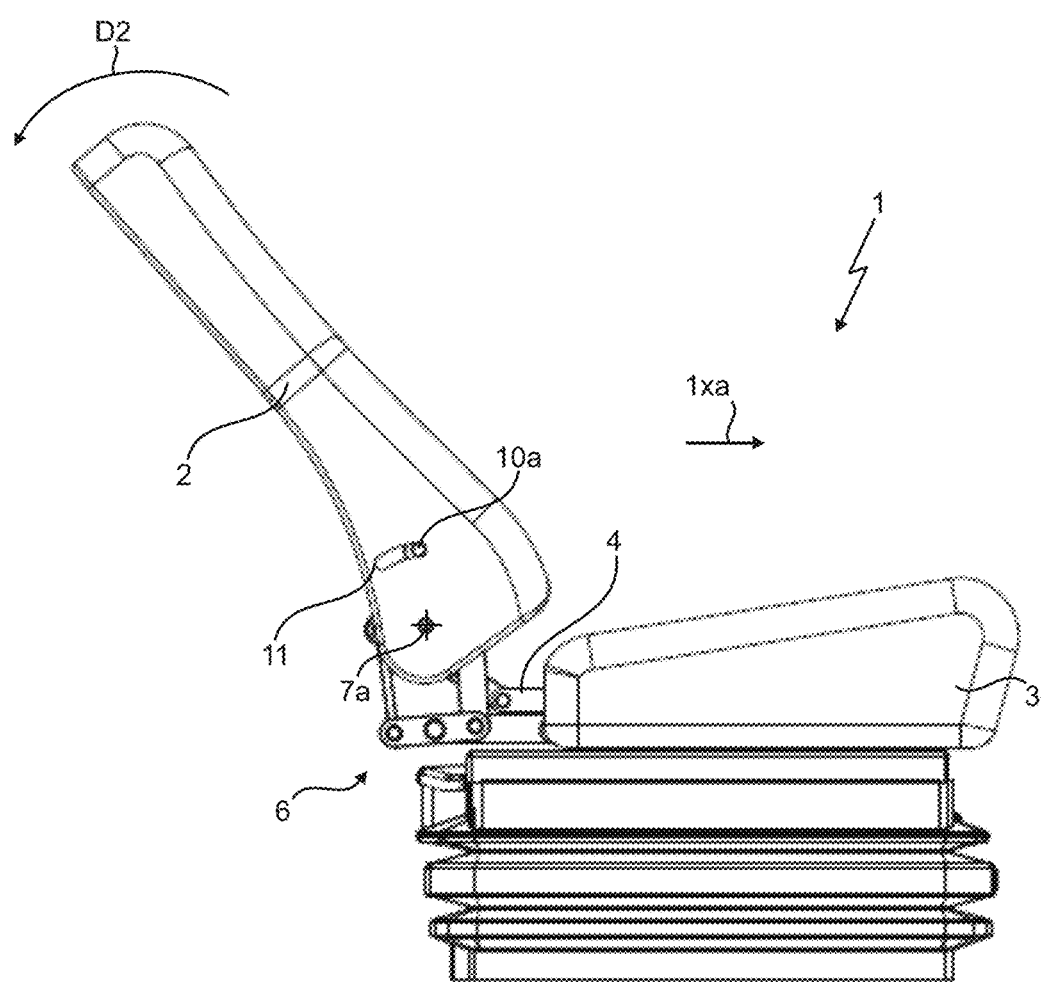
FIGS. 9a, b, c various degrees of inclination of the backrest portion.
Figure 9B:
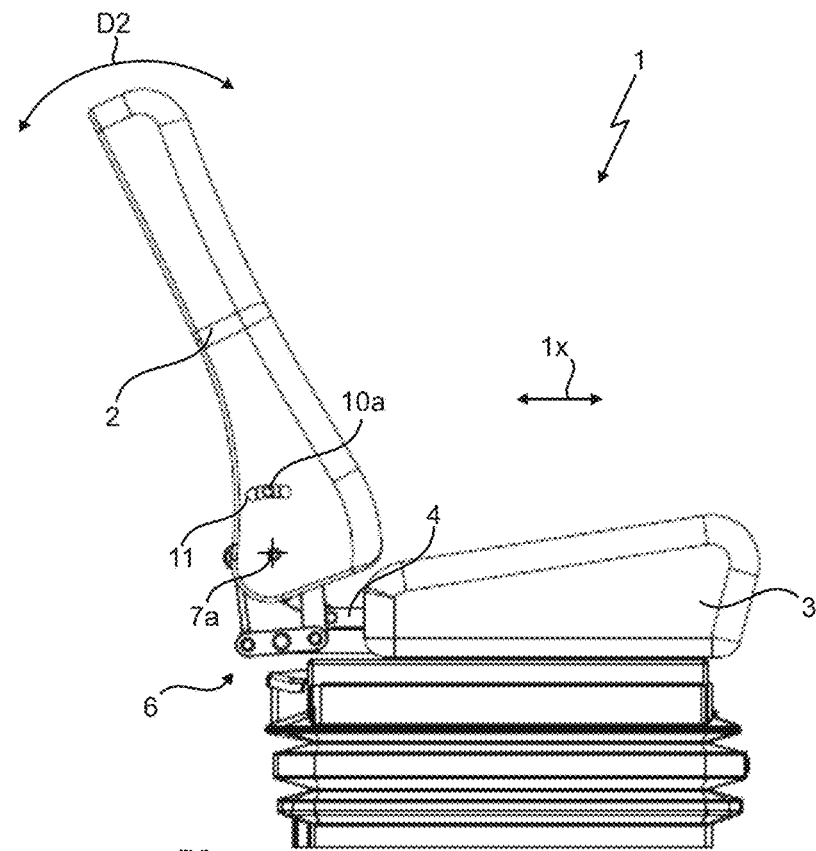
Figure 9C:
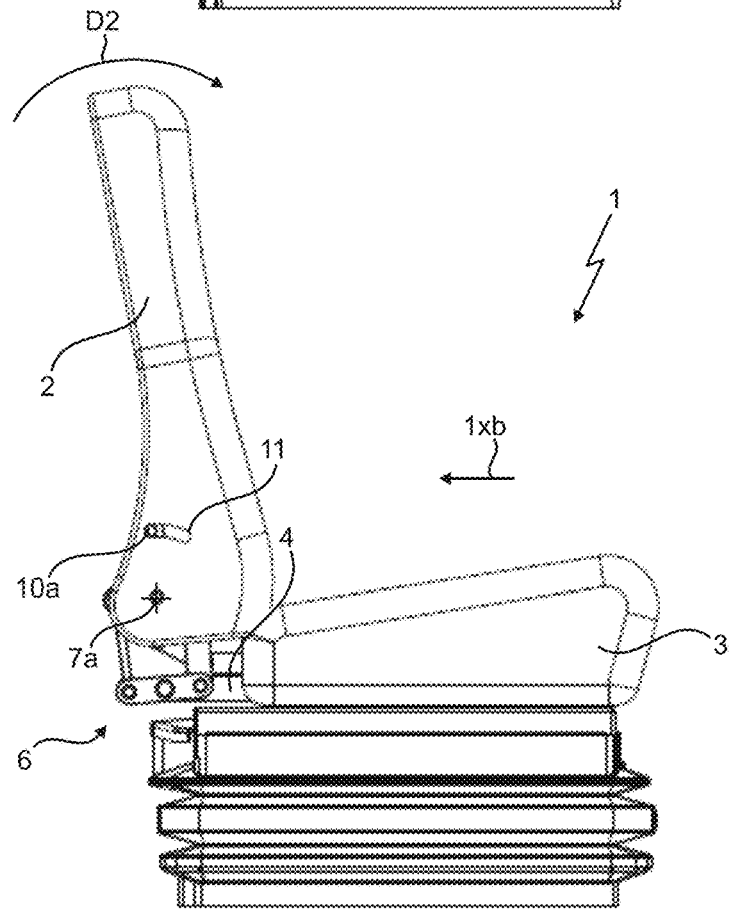

It can be gathered from FIGS. 9a and 9c that a first degree of inclination w1 of the backrest portion 2 with respect to the seating surface portion 3 is adjustable by way of a second rotational movement D2 of the backrest portion 2 around the first axis 7a. An adjustment of this kind offers the driver the option of adjusting the degree of inclination w1 of the backrest portion 2 in the most ergonomic manner possible.

Herein, movement of the backrest portion 2 around the first axis 7a in a direction away from the seating surface portion 3 allows a position of the seating surface portion 3 to be adjusted frontwards 1xa in the longitudinal direction of the seat 1x. In a similar manner, movement of the backrest portion 2 around the first axis 7a in a direction closer to the seating surface portion 3 allows a position of the seating surface portion 3 to be adjusted rearwards 1xb in the longitudinal direction of the seat 1x.

Figure 6A:
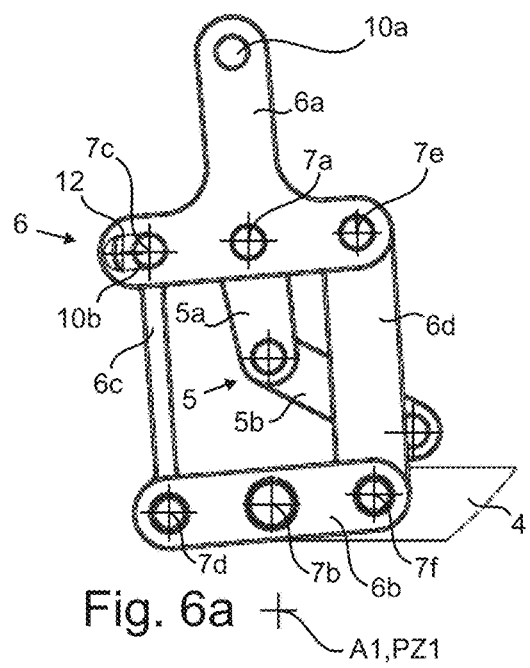
FIGS. 6a, b, c various possible settings for the second lever arrangement in order to adjust the vertical position of the imaginary rotational axis.
Figure 6C:
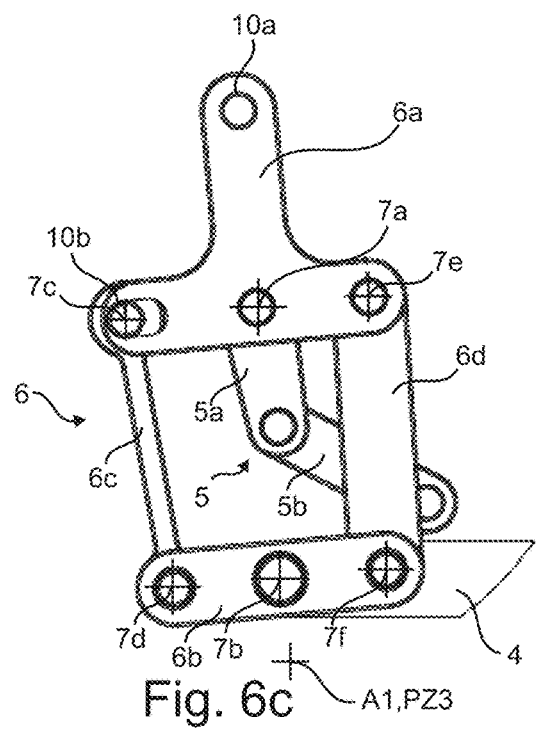
Figure 6B:
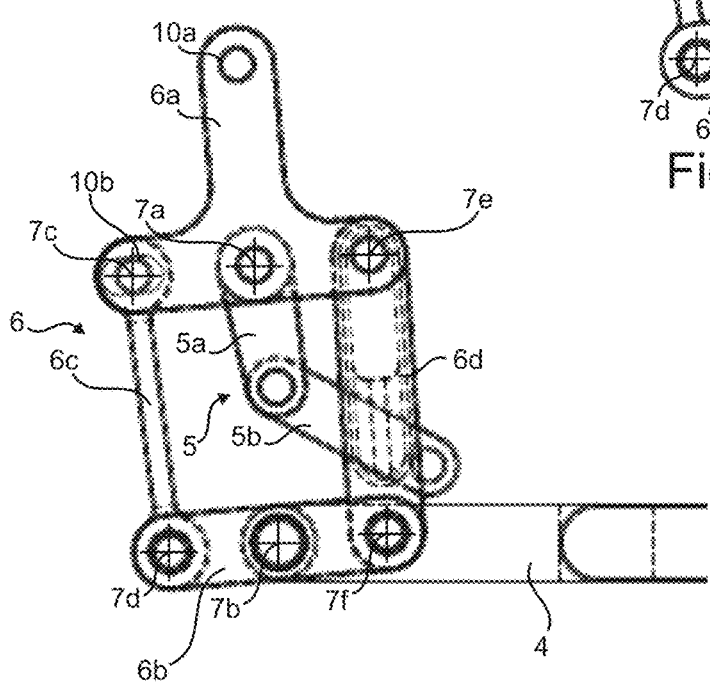

As can be gathered from FIGS. 6a-6c in particular, the second lever arrangement 6 comprises a first lever element 6a, which is swivellably connected with the backrest portion 2 by way of the first axis 7a, a second lever element 6b, which is swivellably connected with the seat base portion 4 by way of the second axis 7b, a third lever element 6c, which is swivellably connected with the first lever element 6a by way of a third axis 7c and, by way of a fourth axis 7d, swivellably connected with the second lever element 6b, and a fourth lever element 6d, which is swivellably connected with the first lever element 6a by way of a fifth axis 7e and swivellably connected with the second lever element 6b by way of a sixth axis 7f, whereby a distance between the first axis 7a and the third axis 7c is variable such that a position of the imaginary rotational axis A1 is adjustable in the vertical direction 1z of the seat. Said second lever arrangement 6 is referred to as a four-bar linkage.

Herein, the third axis 7c, which is formed by way of a central axis of a second pin 10b, is moveably supported within a slot 12 arranged on the first lever element of the second lever arrangement 6. Consequently, the distance between the first axis 7a and the third axis 7c is designed to be variable. After a movement of the third axis 7c, the position of the associated third lever element 6c can be locked by way of locking elements (provided herein but not shown) to prevent movement with respect to the first lever element 6a. The third lever element 6c remains rotatably supported even after said locking to the first lever element 6a.

An explanation of the extent to which movement of the third axis 7c within the slot 12 causes a change in the position of the imaginary rotational axis A1 in a vertical direction 1z can be provided by at least roughly assuming that the first axis 7a and the third axis 7c of the second lever arrangement 6 swivel along a common arc around the imaginary rotational axis A1, with a chord of this arc being formed between the axes 7a, 7c. The greater the distance between the axes 7a and 7c, the closer the chord must be to the centre of its circle, which in this case is situated on the imaginary axis A1, and the smaller the radius of the arc along which the axes 7a, 7c swivel must be. If the distance between the axes 7a and 7c is reduced, then the distance between the chord of the arc and the imaginary rotational axis A1 will also change. Herein, the position and/or the length of the chord cannot be adjusted according to the position of the imaginary rotational axis A1 since the axes 7a, 7c are designed to be fixed in place; as a result, the position of the imaginary rotational axis A1 must be adjusted according to the position and/or the length of the chord, thus moving upwards or downwards in the vertical direction 1z of the seat.

In this context, FIG. 6a shows that the third axis 7c is situated in the frontmost position within the slot 12 with respect to the longitudinal direction of the seat 1x. The position of the imaginary rotational axis A1 moves accordingly into the lowest position PZ1 with respect to the vertical direction of the seat 1z. In a similar manner, FIG. 6c shows that the third axis 7c is situated in the rearmost position within the slot 12 with respect to the longitudinal direction of the seat 1x. The position of the imaginary rotational axis A1 moves accordingly into the highest position PZ3 with respect to the vertical direction of the seat 1z. FIG. 6b shows an intermediate position PZ2 of the imaginary rotational axis A1 with respect to the vertical direction of the seat 1z.

It is similarly evident from FIGS. 6a to 6c and FIGS. 7a to 7c that a second degree of inclination w2 is variable between the second lever element 6b of the second lever arrangement 6 and the seat base portion 4, as a result of which the position of the imaginary rotational axis A1 is adjustable in the longitudinal direction of the seat 1x. This takes place herein by way of rotating the second lever arrangement 6 around the second axis 7b of the second lever arrangement 6, which is swivellably connected with the seat base portion 4 as described above.

In this context, FIGS. 7a to 7c show variously adjusted degrees of inclination w2 of the second lever arrangement 6 and, associated therewith, the various positions PX1, PX2, PX3 of the imaginary rotational axis A1 with respect to the longitudinal axis of the seat 1x. As shown, the imaginary rotational axis A1 can in this case assume a position PX1, PX2, PX3 situated to extend on either side of a plane E1, which extends through the second axis 7b and parallel to the vertical direction of the seat 1z, or it can be situated within said plane E1 itself.

Figure 8:
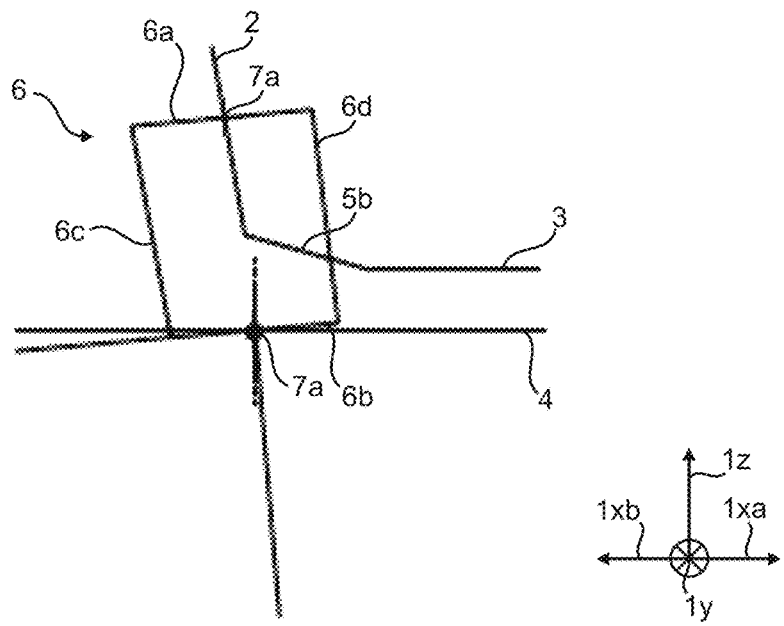
FIG. 8 a detail of FIG. 7b.

In this context, FIG. 7a shows an extreme position, according to which the adjusted position PX1 of the imaginary rotational axis A1 is offset at a maximum rearwards 1xb with respect to the longitudinal axis of the seat 1x. In a similar manner, FIG. 7c shows an extreme position, according to which the adjusted position PX3 of the imaginary rotational axis A1 is offset at a maximum frontwards 1xb with respect to the longitudinal axis of the seat 1x. FIG. 7b shows a position PX2 of the imaginary rotational axis A1 between the two extreme positions shown in FIGS. 7a and 7c, which corresponds to the illustration shown in FIG. 8 in particular.

The enlarged schematic illustration shown in FIG. 8 again shows the second lever arrangement 6 comprising levers 6a, 6b, 6c, 6d which are rotatably arranged around the second axis 7b. Also shown are the backrest portion 2, the seating surface portion 3, and the seat base portion 4. Herein, the illustration shown in FIG. 8 corresponds to a normal position for the degree of inclination w2 of the second lever arrangement 6, according to which said arrangement is swivelled by 5° rearwards 1xb. In the illustration shown, the second lever arrangement 6b is in particular swivelled by 5° counterclockwise with respect to an axis in the longitudinal direction of the seat 1x; this is true for an illustration, like that of FIG. 8, of a view from outside the vehicle seat 1 looking at the right side r of the vehicle seat 1 in the lateral direction of the vehicle seat 1y. This is similarly true of an illustration (not shown) of a view from outside the vehicle seat 1 looking at the left side l of the vehicle seat 1 in the lateral direction of the vehicle seat 1y, in which case the second lever element 6b is in the normal position swivelled by 5° clockwise with respect to an axis in the longitudinal direction of the seat 1x.

Therefore, the vehicle seat 1 shown represents a system with an integrated backrest suspension and a synchronised horizontal suspension. As explained earlier, this system, which can be referred to as RBS+, makes it possible to adjust the position of the rotational axis A1 in the vertical direction of the seat 1z and the longitudinal direction of the seat 1x so that it is identical or nearly identical to the position of the vehicle pitch axis. At the same time, the vehicle seat 1 shown represents a system which is able to work in combination with the moveable seating surface portion 3, which is mechanically connected with the movement of the backrest portion 2, and act as a novel longitudinal-horizontal suspension integrated into the upper seat portion 2, 3, 4.

The drawings do not show a locking means, by way of which a locking can take place between the second lever arrangement 6 and the seat base portion 4 following adjustment of the rotational axis A1 in the vertical direction of the seat 1z and/or the longitudinal direction of the seat 1x.

In addition, it is evident from FIGS. 7a to 7c in particular that the first lever arrangement 5 comprises a first lever element 5a, which is rigidly connected with the first axis 7a, and a second lever element 5b, which is swivellably connected with the first lever element and which is in turn swivellably connected with the seating surface portion 3. Herein, the second lever element 5b is swivellably connected with a third lever element 5c of the first lever arrangement 5, which is in turn rigidly connected with the seating surface portion 3.

An arrangement of this kind makes it possible to convert a suspending movement of the backrest portion 2 in the form of a rotational movement into a suspending movement of the seating surface portion 3 in the form a translational movement. Consequently, it is possible to couple rotary suspending of the backrest portion 2 around the pitch axis y of the vehicle V, which corresponds herein to the lateral direction of the seat 1y, with translational and horizontal suspending of the seating surface portion 3 along the longitudinal axis x of the vehicle V, which corresponds herein to the longitudinal direction of the seat 1x.

Herein, positioning of the imaginary rotational axis A1 can take place by way of an electric drive element (not shown).

Therefore, as shown in FIGS. 7a to 7c, suspending of the backrest portion 2 upon introduction of vibrations takes place by way of a first rotational movement D1 of the backrest portion 2 around the imaginary rotational axis A1. Furthermore, as can be seen in FIGS. 9a to 9c, setting the first degree of inclination w1 of the backrest portion 2 takes place by way of a second rotational movement D2 of the backrest portion 2 around the first axis 7a of the second lever arrangement 6. It can be seen that the first rotational movement and the second rotational movement of the backrest portion 2 can be converted into two oppositely oriented translational movements of the seating surface portion 3 frontwards 1xa and rearwards 1xb.

Herein, the position of the imaginary rotational axis A1 deviates from the position of the first axis 7a in a vertical direction 1z and/or in a longitudinal direction 1x across the entire adjustment range of the second lever arrangement 6. Furthermore, the imaginary rotational axis A1 herein is always arranged beneath the second axis 7b in the vertical direction 1z.

Therefore, the synchro mechanism shown by way of FIGS. 9a to 9c represents a system by means of which a rearwards adjustment of the inclination of the backrest portion 2 causes movement of the seating surface portion 3 frontwards in direction 1xa, whereas the seating surface portion 3 is moved rearwards 1xb when the inclination of the backrest portion 2 is adjusted frontwards in connection with a vertical adjustment of the backrest portion 2.

Herein, adjustment of the degree of inclination w1 of the backrest portion 2 is possible within pre-definable limits given that a pin 10 is guidably arranged in a curved slot 11 on the first lever element 5a of the second lever arrangement 5, said slot being formed on the backrest portion 2. As a result, an adjustment via the end of the curve on which the slot 11 is formed is not possible.

In this context, FIGS. 9a and 9c each show an extreme position of the pin 10 within the slot 11. As shown in FIG. 9a, the backrest portion 2 is thus swivelled maximally rearwards 1xb around the first axis 7a since the pin 10 is situated within and at the frontward end of the slot 11; the seating surface portion 3 is likewise in its frontmost position. Similarly, as shown in FIG. 9c, the backrest portion 2 is swivelled maximally frontwards 1xa around the first axis 7a since the pin 10 is situated within and at the rearward end of the slot 11; the seating surface portion 3 is likewise at its rearmost position. FIG. 9b shows positions of the backrest portion 2, the pin 10, and the seating surface portion 3 between the extreme positions shown in FIGS. 9a and 9c.

It should be understood that the illustrative example explained in the foregoing only relates to a first embodiment of the commercial vehicle seat according to the invention. In this respect, the embodiment of the invention is not restricted to said illustrative example.

All of the features disclosed in the application documents are claimed as being essential to the invention insofar as they are novel with respect to the prior art whether individually or in combination.

LIST OF REFERENCE NUMERALS

1 Vehicle seat
1', 3', 5' Translational movement
2', 4', 6' Rotational movement
1x, 1xa, 1xb Longitudinal direction of the seat
1y Lateral direction of the seat
1z Vertical direction of the seat
2 Backrest portion
3 Seating surface portion
4 Seat base portion
5, 6 Lever arrangement
5a, 5b, 5c, 6a, 6b, 6c, 6d Lever element
7a, 7b, 7c, 7d, 7e, 7f Axis
8 Shaft element
10a, 10b Pin
11, 12 Slot
A1 Imaginary rotational axis
D1, D2 Rotational movement
E1 Plane
l, r Side
P1, P2, P3 Arrow
PX1, PX2, PX3, PZ1, PZ2, PZ3 Position
V Vehicle
x Longitudinal direction of the vehicle
y Lateral direction of the vehicle
z Vertical direction of the vehicle
w1, w2 Degree of inclination

What is claimed is:

1. A vehicle seat comprising a backrest portion and a seating surface portion, each of which is arranged to be connected with a seat base portion,
    wherein the backrest portion is resiliently arranged and supported to be able to swivel with respect to the seat base portion,
    wherein the seating surface portion is arranged to be able to move in at least a longitudinal direction of the seat frontwards- and rearwards with respect to the seat base portion,
    wherein the backrest portion and the seating surface portion are operatively connected together via a first lever arrangement in such a way that the seating surface portion is able to move rearwards in the longitudinal direction of the seat when the backrest portion makes a suspending movement with respect to the seat base portion in a direction away from the seating surface portion,
    wherein, when the suspending movement is made with respect to the seat base portion, the backrest portion is able to swivel around an imaginary rotational axis extending in the lateral direction of the seat, and
    wherein a second lever arrangement is arranged between the backrest portion and the seat base portion, the second lever arrangement being swivellably connected with the backrest portion by way of a first axis and swivellably connected with the seat base portion by way of a second axis.

2. The vehicle seat according to claim 1, wherein a first degree of inclination of the backrest portion is adjustable with respect to the seating surface portion by way of rotational movement of the backrest portion around the first axis.

3. The vehicle seat according to claim 2, wherein a position of the seating surface portion is adjustable frontwards in the longitudinal direction of the seat when the backrest portion moves around the first axis in a direction away from the seating surface portion.

4. The vehicle seat according to claim 1, wherein the second lever arrangement comprises:
- a first lever element, which is swivellably connected with the backrest portion by way of the first axis,
- a second lever element, which is swivellably connected with the seat base portion by way of the second axis,
- a third lever element, which is swivellably connected with the first lever element by way of a third axis and, by way of a fourth axis, swivellably connected with the second lever element, and
- a fourth lever element, which is swivellably connected with the first lever element by way of a fifth axis and swivellably connected with the second lever element by way of a sixth axis, wherein a distance between the first axis and the third axis is variable such that a position of the imaginary rotational axis is adjustable in the vertical direction of the seat.

5. The vehicle seat according to claim 1, wherein a second degree of inclination is variable between a second lever element of the second lever arrangement and the seat base portion, as a result of which a position of the imaginary rotational axis is adjustable in the longitudinal direction of the seat.

6. The vehicle seat according to claim 1, wherein adjustment of a position of the imaginary rotational axis takes place manually or automatically by way of an electric or pneumatic drive element.

7. The vehicle seat according to claim 2, wherein the second lever arrangement comprises:
- a first lever element, which is swivellably connected with the backrest portion by way of the first axis,
- a second lever element, which is swivellably connected with the seat base portion by way of the second axis,
- a third lever element, which is swivellably connected with the first lever element by way of a third axis and, by way of a fourth axis, swivellably connected with the second lever element, and
- a fourth lever element, which is swivellably connected with the first lever element by way of a fifth axis and swivellably connected with the second lever element by way of a sixth axis, wherein a distance between the first axis and the third axis is variable such that a position of the imaginary rotational axis is adjustable in the vertical direction of the seat.

8. The vehicle seat according to claim 2, wherein a second degree of inclination is variable between a second lever element of the second lever arrangement and the seat base portion, as a result of which a position of the imaginary rotational axis is adjustable in the longitudinal direction of the seat.

9. The vehicle seat according to claim 2, wherein the first lever arrangement comprises a first lever element rigidly connected with the first axis as well as a second lever element, which is swivellably connected with the first lever element and which is in turn swivellably connected with the seating surface portion.

10. The vehicle seat according to claim 3, wherein a second degree of inclination is variable between a second lever element of the second lever arrangement and the seat base portion, as a result of which a position of the imaginary rotational axis is adjustable in the longitudinal direction of the seat.

11. The vehicle seat according to claim 3, wherein the first lever arrangement comprises a first lever element rigidly connected with the first axis as well as a second lever element, which is swivellably connected with the first lever element and which is in turn swivellably connected with the seating surface portion.

12. The vehicle seat according to claim 7, wherein adjustment of the position of the imaginary rotational axis takes place manually or automatically by way of an electric or pneumatic drive element.

13. The vehicle seat according to claim 7, wherein the position of the imaginary rotational axis can be locked.

14. The vehicle seat according to claim 1, wherein the position of the imaginary rotational axis can be locked.

15. The vehicle seat according to claim 2, wherein adjustment of a position of the imaginary rotational axis takes place manually or automatically by way of an electric or pneumatic drive element.

16. The vehicle seat according to claim 2, wherein a position of the imaginary rotational axis can be locked.

17. The vehicle seat according to claim 3, wherein adjustment of a position of the imaginary rotational axis takes place manually or automatically by way of an electric or pneumatic drive element.

18. The vehicle seat according to claim 3, wherein a position of the imaginary rotational axis can be locked.

19. The vehicle seat according to claim 1, wherein the first lever arrangement comprises a first lever element rigidly connected with the first axis as well as a second lever element, which is swivellably connected with the first lever element and which is in turn swivellably connected with the seating surface portion.

20. A vehicle seat comprising a backrest portion and a seating surface portion, each of which is arranged to be connected with a seat base portion,
- wherein the backrest portion is resiliently arranged and supported to be able to swivel with respect to the seat base portion,
- wherein the seating surface portion is arranged to be able to move in at least a longitudinal direction of the seat frontwards and rearwards with respect to the seat base portion,
- wherein the backrest portion and the seating surface portion are operatively connected together via a first lever arrangement in such a way that the seating surface portion is able to move rearwards in the longitudinal direction of the seat when the backrest portion makes a suspending movement with respect to the seat base portion in a direction away from the seating surface portion, and
- wherein the first lever arrangement comprises a first lever element rigidly connected with a first axis as well as a second lever element, which is swivellably connected with the first lever element and which is in turn swivellably connected with the seating surface portion.

* * * * *